United States Patent [19]

von der Heide et al.

[11] Patent Number: 4,651,241

[45] Date of Patent: Mar. 17, 1987

[54] PULSE GENERATOR IN STORAGE DRIVES

[75] Inventors: Johann von der Heide, Schramberg; Ernst-Moritz Körner, St. Georgen-Brigach; Edgar Müller; Rolf Müller, both of St. Georgen, all of Switzerland

[73] Assignee: Papst-Motoren GmbH & Co. KG, St. Georgen, Fed. Rep. of Germany

[21] Appl. No.: 529,018

[22] Filed: Sep. 2, 1983

[30] Foreign Application Priority Data

Sep. 4, 1982 [SE] Sweden ............................ 5261/82

[51] Int. Cl.⁴ ........................................ G11B 5/012
[52] U.S. Cl. .............................. 360/97; 307/264; 324/173
[58] Field of Search ............................ 360/97–99; 307/264; 324/173

[56] References Cited

U.S. PATENT DOCUMENTS 4,169,232 9/1979 Henrich .................. 307/264 X
4,216,512 8/1980 Vidwans ................... 360/97 X Primary Examiner—A. J. Heinz
Attorney, Agent, or Firm—Fitch, Even, Tabin & Flannery

[57] ABSTRACT

Device for a drive for storage media for the generation of at least one index pulse per revolution of a rotating element with a generator, which, during operation, for each revolution of the rotating component, generates at least one signal pulse that alternates once between two polarities, and with an evaluating circuit activated by these alternating signal pulses to generate the index pulses at its output. The evaluating circuit includes a comparator with asymmetrical hysteresis with two inputs and one output, between the two inputs of which comparator the output signal of the generator lies, and the hysteresis of which is tuned to the generator output signal such that the comparator output sharply changes from a first to a second potential when the amplitude of the signal pulse at a preset polarity exceeds a preset switching voltage value, and sharply returns from the second to the first potential when the signal pulse passes through its zero crossing from the preset to the opposite polarity.

37 Claims, 13 Drawing Figures

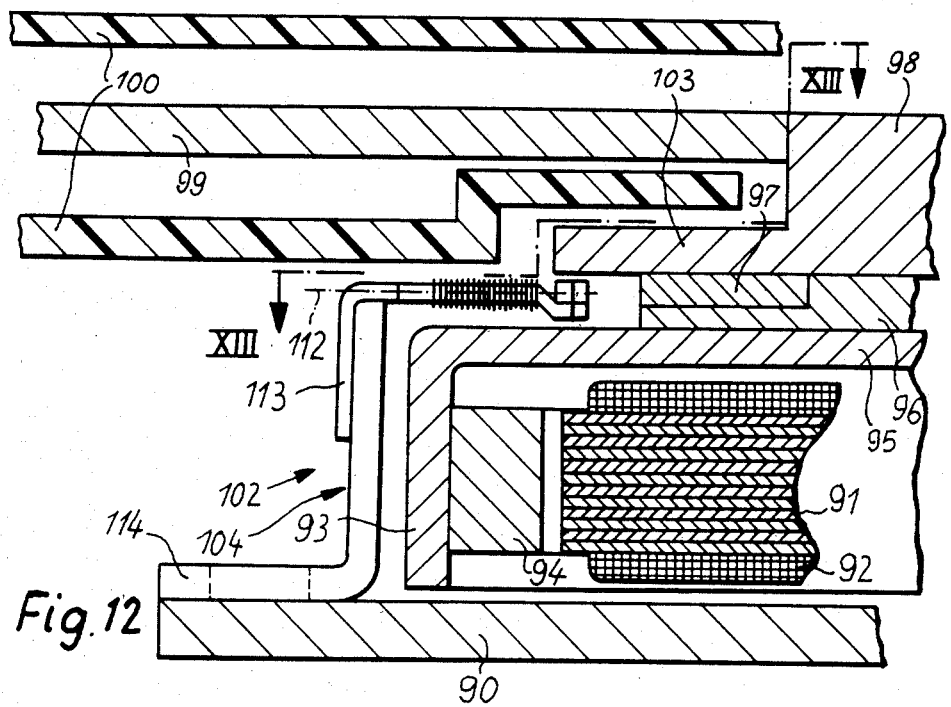
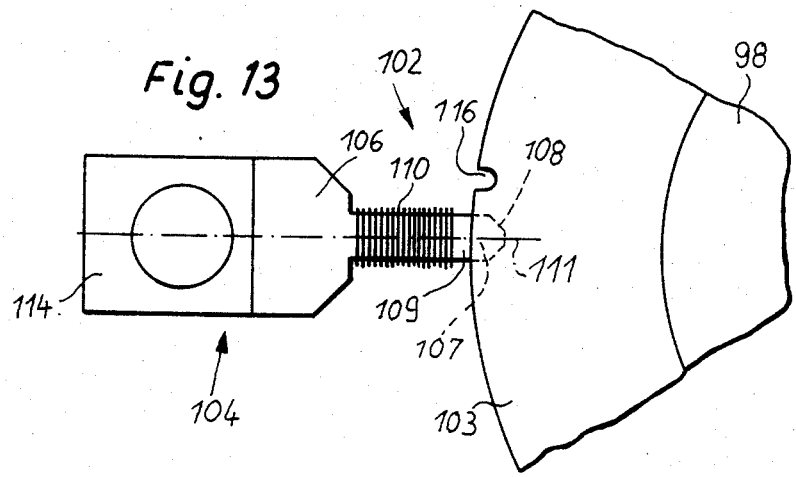

PULSE GENERATOR IN STORAGE DRIVES

The invention concerns a drive arrangement for storage media with a drive motor and a device for the generation of pulses with a frequency proportional to the speed of the motor, in particular for the generation of one pulse per motor revolution. Motors for the driving of disk memories of data technology have speeds which generally lie between 3600 and 5000 rpm. For controlling the reading heads of such motors, one needs extremely precise rotor position signals so that data can be correctly input (as to angle) onto the individual tracks of the disk memory or can be correctly retrieved from those tracks. Various proposals have become known for this. One of these is shown in the U.S. Pat. No. 4,430,603. There, a specially magnetized magnetic track is used, to which are associated special galvanomagnetic sensors. This solution is precise—given constant operating temperatures—but it is expensive. If strong temperature fluctuations occur, the sensors can display an undesired temperature sensitivity, whereby the precision of the signal can suffer.

In UK Patent Application No. 2,127,231, it is further proposed that one install an inductive sensor in the form of a small coil on the inside an external rotor type motor. However, signals by the stator will also be induced in this coil, so that it is difficult to obtain precise, disturbance-free pulses with which a satisfactory controlling of the data flow from and to the disk memory is possible.

Rotary position pulses can also be relatively simply generated with light or reflex barriers. But the optical components are comparatively expensive; they age and they also can become dirty.

Index pulses for the determination of a preset angular position of a rotating component are also needed, for example, in drives for video head drums.

It is a problem of the invention to create a device, in a manner which is reliable and is largely independent of ambient conditions, to generate highly precise position indentification pulses (index pulses).

For solution of this problem, according to the invention, there are provided a generator, which during the operation generates signal pulses, that alternate once between two polarities and are essentially free of direct current, and an evaluating circuit, which is activated with these alternating signal pulses for the purpose of generating speed-proportional index pulses, and which is equipped with a comparator with asymmetrical hysteresis. Between the two inputs of these lies the output signal of the generator whose hysteresis is tuned to the generator output signal in such a manner that the comparator output jumps from a first to a second potential when the amplitude of the signal pulse at a preset polarity exceeds a preset switching voltage value and then jumps back from the second to the first potential when the signal pulse passes through its zero crossing from the preset polarity to the opposite one.

With skilled use of the asymmetrical hysteresis of the comparator, one attains an extremely precise generation of pulse in the point in time in which the alternating voltage pulse passes through the zero crossing between its two polarities. As this zero crossing is independent of temperature and aging of the components of the generator, its determination results in a highly precise signal which is largely free of tolerances. Since, furthermore, the signal amplitude at low speeds is not sufficient to switch the comparator, the generation of pulses simultaneously indicates that a specific speed has been attained and that, with the case of a magnetic disk memory, the read/write heads can now generate an adequate air cushion.

It can be advantageous to use an inductive generator. Corresponding to a preferred embodiment of the invention, the generator has a permanent magnetic sensor magnet and a sensor coil which works in cooperation with it. The sensor magnet and sensor coil are thereby rotatable relative to one another with a speed corresponding to the speed of the drive motor so that they pass one another once with each revolution of the drive motor. Corresponding to an alternative embodiment of the invention, the generator is equipped with a permanent magnetic sensor magnet, a sensor coil which is arranged immobile in reference to the sensor magnet and a soft ferromagnetic component which has a discontinuity. The unit consisting of the sensor magnet and the sensor coil and the ferromagnetic component are rotatable relative to each other with a speed corresponding to the speed of the drive motor so that they pass one another once with each revolution of the drive motor. The discontinuity of the soft ferromagnetic component leads to a change of the permeance. In both embodiments, a signal pulse of the foregoing type is generated in the sensor coil once per revolution.

For the suppression of higher-frequency interfering signals, a low-pass filter can be preconnected to the inputs of the comparator.

The comparator used within the framework of the invention can be constructed especially simply out of a differential amplifier and a wiring system associated to this amplifier to force the asymmetrical hysteresis. Such wiring system can involve, for example, a first resistor lying between the output and the non-inverting input of the differential amplifier, a second resistor lying between the output and a supply voltage connector and a third resistor preconnected to the non-inverting input. Thereby, the inverting input of the differential amplifier can simply be placed at zero potential.

Preferably, a monoflop (one-shot multibvibrator) is connected to the output of the comparator. This makes it possible to convert the output signal of the comparator to an index pulse, the width of which is independent of the speed of the drive motor.

The drive motor can advantageously be a motor of the external rotor type with a stator and a rotor magnet surrounding the stator. Thereby, the sensor magnet can be seated on one axial end of the rotor magnet and be connected with this in a manner which prevents turning, while the sensor coil is located on the stator in the vicinity of an orbit traveled by the sensor magnet. To substantially eliminate influence on the sensor coil by the rotor magnet, which has, for example two or more pair of poles, it is advantageous to place a shielding ring of soft ferromagnetic material on the one axial end of the rotor magnet. This shielding ring includes a recess in which the sensor magnet is located.

If the drive arrangement is intended to be used with a magnetic storage medium, for example, magnetic storage disks, preferably a magnetic shielding is provided between drive parts of the drive which generate magnetic fields and a space for the receiving of the magnetic storage medium. This is a safeguard against losses of data and interference during the input and output of data. The magnetic shielding can in particular display a soft ferromagnetic shielding plate, connected with the stator, which lies opposite the one axial end of the rotor magnet.

The sensor coil advantageously displays a soft ferromagnetic core. This can be adjustable in an essentially perpendicular direction to the plane of the orbit of the sensor magnet. This makes it possible to adjust the size of the air gap between sensor coil and sensor magnet. For this purpose, there can be fastened simply in a recess of the shielding plate a bush with an internal thread, and the coil core can carry an external thread which engaged the internal thread of the bush.

A part of the stator is formed in a practical manner by a PC board, which can carry the comparator and further circuit components, such as a speed regulator and/or, in the instance of a brushless DC motor, the commutation electronics. The PC board can be mounted on the side of the shielding plate which faces the rotor magnet, and the circuit components can be mounted on the side of the PC board which faces the rotor magnet. This provides a particularly compact construction in the axial direction, since potentially obstructing circuit components can be arranged so that they fit into grooves of the stator winding to thus utilize already available space. However, it is also possible to arrange the PC board on the side of the shielding plate which faces away from the rotor magnet, and to mount the circuit components on the side of the PC board which faces away from the rotor magnet. In the latter case, the sensor coil can be mounted at the PC board, and the shielding plate can have a recess into which the coil core projects. The field of the rotor magnet in such an instance has a relatively weak effect, so that the additional shielding ring can be dispensed with.

In the instance of the embodiment form in which the sensor coil is non-adjustable with respect to the sensor magnet, the sensor magnet is advantageously set on the end of the coil core which faces the soft ferromagnetic component.

The rotor magnet can advantageously be housed in a rotor housing of soft ferromagnetic material which has the shape of an open bell and forms a discontinuity, having, for example, a slit on its rim for this purpose.

When it is important to house the sensor device in a very small space and also to attain a high ratio of working voltage to interference voltage, the generator is advantageously provided with a sensor tip of soft ferromagnetic material, which near one of its ends carries a sensor magnet constructed as miniature permanent magnet, and in a region axially adjacent to it, carries the sensor coil. Experiments have shown that in this manner, sensor units can be constructed which require an axial installation space of only about 1 mm. The thus-constructed sensor unit has a high efficiency. That is, it is little influenced by interfering fields, and it generates an acceptably identifiable signal pulse when, and only when the discontinuity of the soft ferromagnetic component passes by. In the interest of a further miniaturization of the sensor unit, the end of the sensor tip which bears the sensor magnet is bent at an angle. The size of the bend is advantageously dimensioned such that the middle plane of the arrangement consisting of the sensor magnet and the end of the sensor tip carrying the sensor magnet is essentially aligned with the middle plane of the extended part of the sensor tip which carries the sensor coil. Furthermore in the plane in which the sensor tip is bent at an angle, the dimension of the sensor coil is equal to or smaller than the sum of the dimensions of the sensor magnet and the end of the sensor tip which carries it.

For increasing the response precision, the sensor magnet can be tapered on the end facing away from the sensor coil in the plane which is perpendicular to the plane of the bend. In a further embodiment of the invention, the sensor tip is fastened to a non-ferromagnetic carrier. For example, it is glued to a carrier of aluminum sheet, in order to further reduce influence from interfering fields.

The invention will be explained more precisely in the following with the use of preferred embodiment examples. In the attached drawings:

FIG. 12 shows a partial section through a hard disk memory drive with a miniature sensor unit; and FIG. 13 shows a top view along the line XIII—XIII of FIG. 12.

Figure 1:
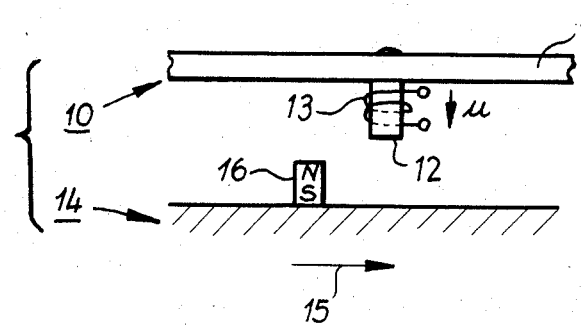
FIG. 1 shows a schematic depiction of a first embodiment of a device for the generation of a measuring voltage in a sensor coil by means of a passing object.
Figure 3:
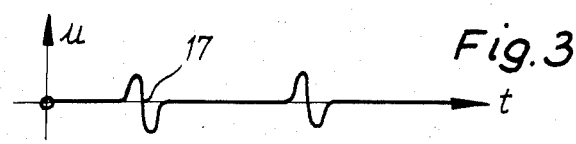
FIG. 3 shows a schematic depiction of alternating signal pulses generated in the sensor coils according to the FIGS. 1 and 2.

FIG. 1 shows a stationary stator 10 with an iron plate 11 on which there is firmly riveted a soft magnetic coil core 12. A sensor coil 13 is located on the core 12. Located on a rotor 14, which moves in the direction of the arrow 15, is a sensor magnet 16. this sensor magnet 16 is designed as a permanent magnet. If the sensor magnet 16 moves past the sensor coil 13, a signal pulse u is generated, which alternates between two polarities as shown in FIG. 3. Such a pulse is first positive and then changes via a zero crossing 17 into a negative partial pulse. Both partial pulses have equal voltage-time surfaces. The overall pulse is thus direct current-free.

Figure 2:
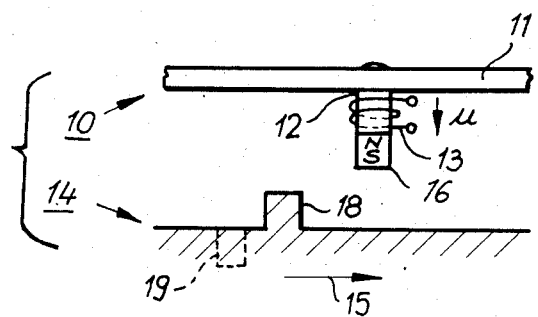
FIG. 2 shows a schematic depiction of a second embodiment of a device for the generation of a measuring voltage in a sensor coil by means of a passing object.

FIG. 2 shows an alternative. Hereby, in series with the coil core 12, a stationary sensor magnet 16 is provided, and on the rotor 14 (of soft iron), a discontinuity is provided in the form of a projection 18 (or alternatively a recess 19). Here too, in the sensor coil 13, an alternating signal pulse u (FIG. 3) is generated when either the projection 18 or the recess 19 passes it.

Figures 4, 5:
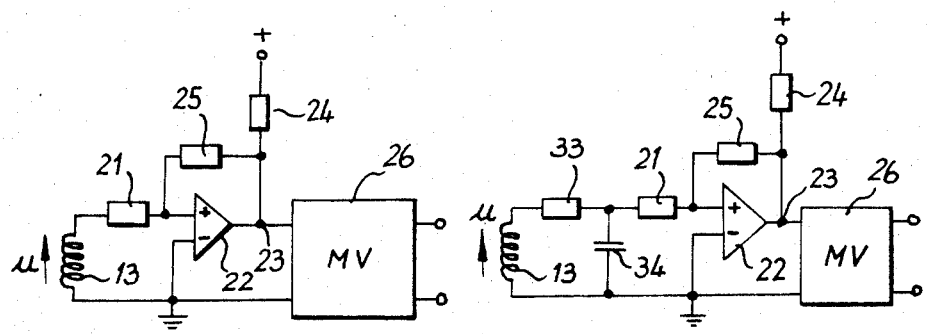
FIG. 4 shows a first form of an evaluating circuit in accordance with the invention.
FIG. 5 shows a second form of an evaluating circuit according to the invention with an additional filter for the filtering out of interfering voltages.

In both variations, the zero crossing 17 of a signal pulse u arises when the sensor coil 13 and the sensor magnet 16 (FIG. 1) or the discontinuity 18 or 19 (FIG. 2) are in direct opposition. This zero crossing is as a result a precise measurement of the rotor position, and it is independent of changes in temperature, changes in the operating voltage, changes in the interval and occurrence of aging. FIGS. 4 and 5 show two circuits according to the invention for the precise evaluation of this zero crossing.

Figure 8:
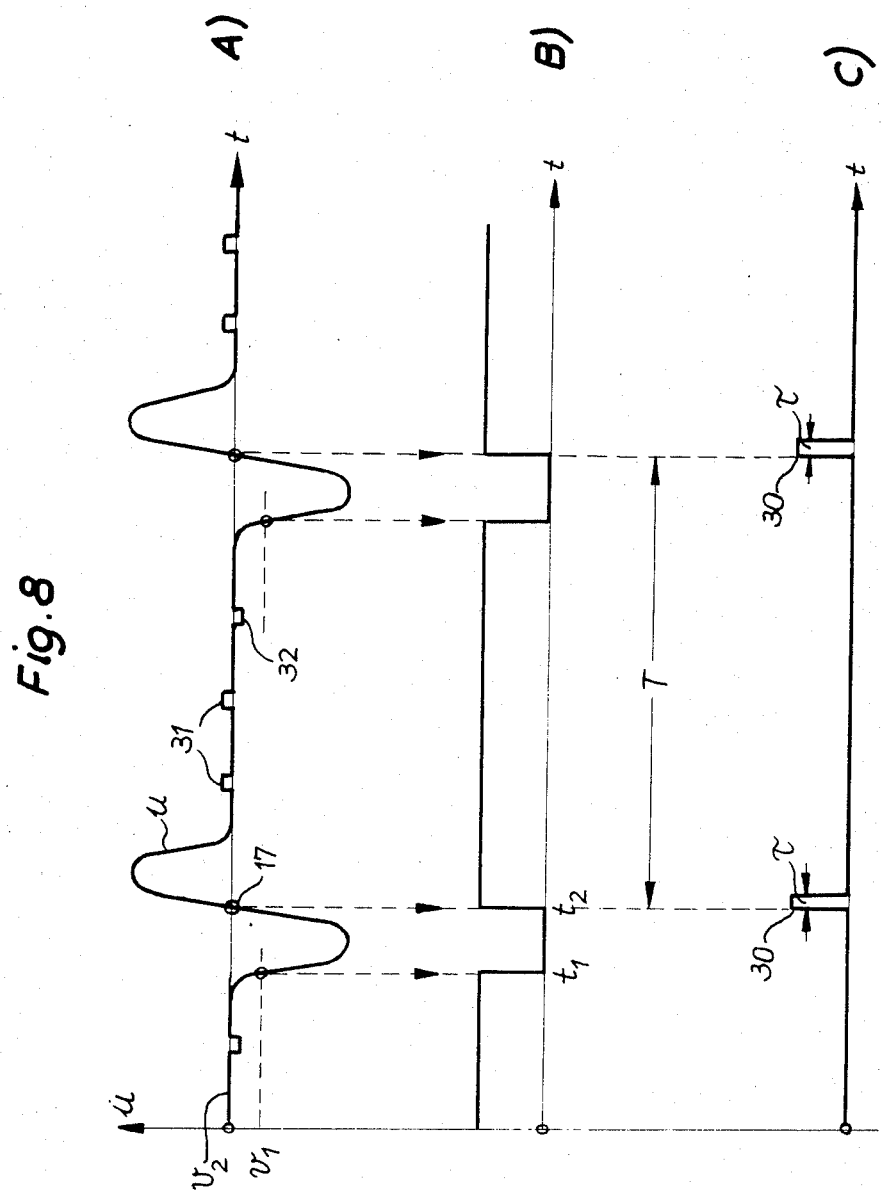
FIG. 8A is a first of three curves depicting the manner of operation of the evaluating circuit according to FIGS. 4 and 5 specifically showing a voltage u between inverting and non-inverting inputs of a comparator according to the invention.
FIG. 8B shows the output of the comparator responsive to certain portions of the curve of FIG. 8A.
FIG. 8C shows signal pulses generated by a multivibrator of the invention in response to the shown sudden change from ground potential to positive potential of the curve of FIG. 8B.

Corresponding to FIG. 4, the one end of the sensor coil 13 via a resistor 21 is connected with the non-inverting input of a differential amplifier 22 and the other end of the sensor coil is connected with its inverting input and with ground. The output 23 of the differential amplifier 22 is connected via a resistor 24 with a positive feed potential and via a resistor 25 with the non-inverting input of the differential amplifier 22. The differential amplifier 22 and the wiring of this amplifier, consisting of the resistors 21, 24, 25, form a comparator with asymmetrical hysteresis, as is explained more precisely in connection with FIG. 8.

FIG. 8A shows a voltage u between the two inputs of the comparator 21 through 25. This voltage is poled such that it corresponds to the switching hysteresis of the comparator, thus optimally utilizes its storage characteristics. For this, the alternating signal pulse u (FIG. 8A) is poled such that first the inverting input of the amplifier 22 becomes more negative than the non-inverting input. The result is that the value of u falls below the already lower threshold voltage $v_1$ of the comparator, which maybe, for example, $-40$ mV, so that the output 23 of the comparator at the time $t_1$ sharply changes or jumps to ground potential, as is shown in FIG. 8B. Accordingly, there is the prerequisite that the induced voltage u has an amplitude, the value of which is greater than $v_1$. If this amplitude is smaller, then no signals are generated, that is, at too low a speed, one obtains no pulse at the output 23, and the presence of this pulse can thus be used as a sign of the exceeding of a minimum speed and therefore could be used, for example, for the controlling of the reading heads of a magnetic disk memory. When the alternating signal pulse u crosses over the zero line $v_2$ at the zero passage 17 again from negative to positive values, at the time $t_2$, the output 23 sharply returns or jumps back to a positive potential, as FIG. 8B shows, and this jump in potential triggers the multivibrator 26, which, in accordance with FIG. 8C releases a short signal pulse 30 of the fixed duration $\tau$.

The precision of the switchover point $t_2$ depends only upon the size of the offset voltage of the comparator.

The process described then repeats periodically with the rotational frequency of the monitored motor. The interval T (FIG. 8C) between two pulses 30 is thereby a highly precise measurement for the particular speed, and the position of the index pulses 30 is a highly precise measurement of the momentary angular position of the rotor.

Positive interference pulses 31, which come from the commutation of the motor, do not interfere, as the output 23 is already positive. Nor do negative pulses 32 interfere, as long as they are similar in value than the lower threshold voltage $v_1$, which can be selected correspondingly. In this manner, the asymmetry of the switching behavior of the comparator 21 through 25 is utilized very skillfully.

If one must be prepared for strong interfering pulses 31, 32, the input voltage u can be filtered according to FIG. 5. For this, one uses a filter, which consists of a resistor 33, a capacitor 34 and the resistor 21. However, one hereby obtains a phase shift of the voltage u in the direction of elapsed time; that is, the comparator is switched in later, which must be taken into consideration in the following electronics. In the layout of FIG. 5, one advantageously proceeds such that the value of the resistor 33 amounts to about a tenth of the value of resistor 21, while the feedback resistor 25 should amount to about 50 times the resistor 21. Here, too, it is important that the segment of negative polarity of the signal pulse u arrives at the comparator first and blocks its output, so that following this—at the zero passage 17 to the segment of positive polarity—the output 23 can jump to a positive value and trigger the multivibrator 26. If low-interference signal pulses u are used, the filter elements 33, 34 can be kept small or be entirely dispensed with.

Figure 6:
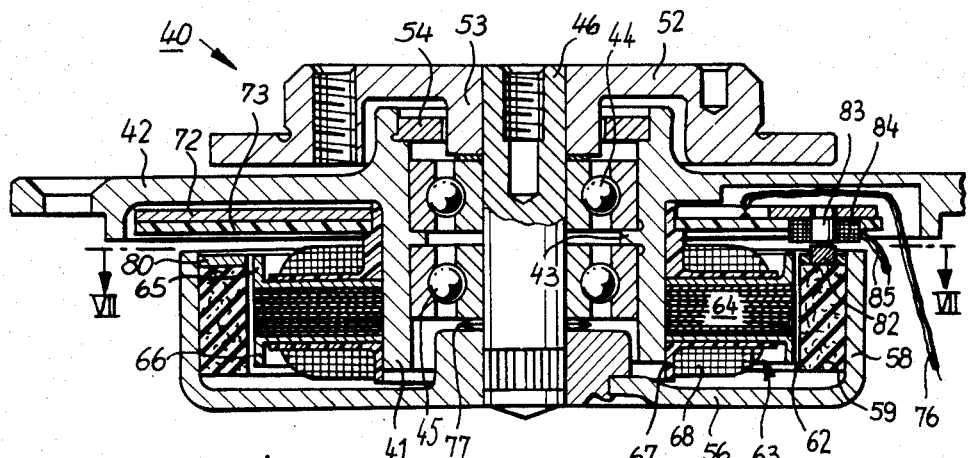
FIG. 6 shows a section through a brushless DC motor of the external rotor type for the driving of a disk memory, wherein a sensor coil and a sensor magnet are correspondingly provided.
Figure 7:
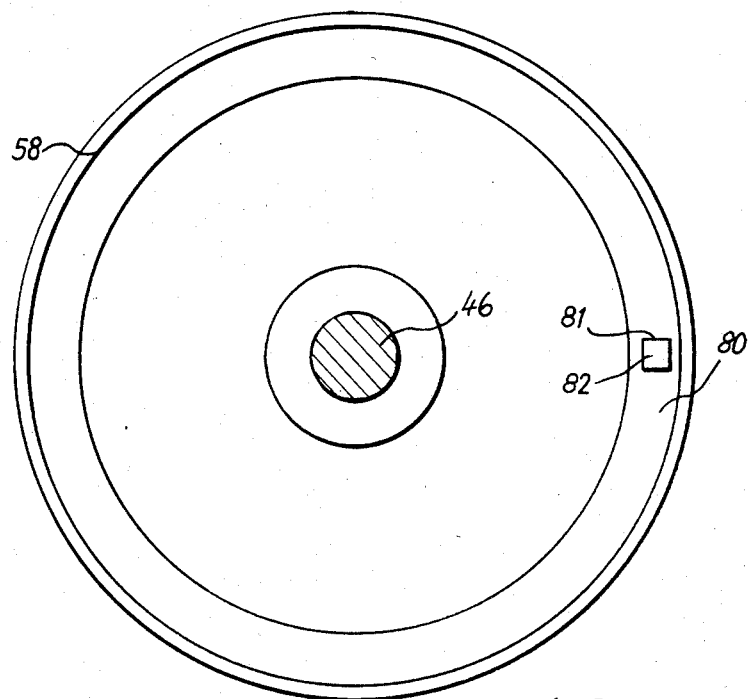
FIG. 7 shows a section only through the external rotor along the line VII—VII of FIG. 6, in a scale of enlargement of about 2:1.

FIGS. 6 and 7 show a disk memory motor 40, whereby one—without enlarging the motor—can generate low-interference signal pulses. This motor has a bearing tube 41 with a bearing flange 42. Arranged in the bearing tube 41, separated from one another by means of a radial projection 43, are two ball bearings 44, 45, which support a drive shaft 46. The inner ring of the upper ball bearing 44 is tightly connected to the shaft 46, e.g. by gluing. The center distance of the two bearings 44, 45 approximately corresponds to the diameter of the shaft 46. The inner ring of the lower bearing 45 is movable on the shaft 46.

A hub 52 is fastened on the upper end of the shaft 46. The hub serves for the receiving and holding of a memory disk (not shown), whose central bore has a diameter which corresponds to the external diameter of the hub 52. This hub 52 has an inwardly projecting collar 53, and this forms the inner part of a magnetic liquid seal, the outer part of which is formed by a magnetic ring 54, fixed into the bearing axle tube 41. Between this magnetic ring 54 and the collar 53 lies a known magnetic sealing liquid, see Scientific American, October 1982, pp. 124–133.

Set on the lower end of the shaft 46 with a force fit is a deep-drawn, saucer-type rotor housing 56 made of a magnetically conductive material. FIG. 6 shows two versions of this. In the outer edge 58 of the rotor housing 56 there is inserted a continuous magnetic ring 59, e.g. a so-called "rubber magnet". Magnetization depends on the type of motor. This can, for example, be 4-pole radially magnetized, and preferably with an approximately trapezoidal induction curve corresponding to German LP No. 23 46 380. The magnetic ring 59 is separated by means of a cylindrical air gap 62 from a stator construction 63. The latter contains a stack of stator plates 64, e.g. with 4 T-armatures, thus four grooves, and on its axial ends are placed angled elements 65, 66. The angled ends of these elements 65, 66 form an axial extension of the air gap 62, that is, its radial spacing from the inner surface of the magnetic ring 59 is identical to the radial distance of the stack of stator plates 64 in the same sectional plane. Applied on the elements 65, 66 is an insulating layer 67, and, on this, the stator winding is 68 is wound. Depending on the type of motor structure, this can, for example, be a one, two or three-filament winding.

Above the magnetic ring 59, for the magnetic shielding, there is fastened an approximately annular plate 72 of magnetically conductive material, and directly under it there lies a PC board 73, upon which are arranged the electronic components of the motor 40, such as, the circuitry components of FIG. 4 or 5, and, as position sensor for the commutation, a Hall-IC which projects into a groove of the stack of stator plates 64. A cable 76 serves as connector of the PC board 73.

Between the bottom of the rotor housing 56 and the inside ring of the ball bearing 45 there is provided a plate spring 77, which braces the two bearings 44 and 45 against one another. Such a motor is the subject of UK Patent Application No. 2,127,231 A.

Above the magnetic ring 59, and still inside the upper edge of the outside edge 58, there is a shielding ring 80 of soft ferromagnetic material. This ring 80 can, for example, have a thickness of 0.5 mm; it displays a recess 81 (FIG. 7), and in this recess, on the magnetic ring 59, a cobalt-samarium sensor magnet 82 is fastened, which can have a height of 1 mm and which is polarized in the axial direction of the motor. Thus, for example in FIG. 7, it has a north pole on its visible top side and a south pole on its invisible underside.

Firmly riveted in the shielding plate 72 is a pin 83 of soft ferromagnetic material which is fastened such that it projects toward the sensor magnet and is only at a small spacing therefrom when this magnet 82 is located under it, as shown in FIG. 6. Fastened around the pin 83 is a sensor coil 84, the connection of which is designated with 85 and which corresponds to the sensor coil 13 in FIG. 1.

When the rotor 56 turns during motor operation, the sensor magnet 82 induces an alternating signal pulse in the sensor coil 84 with each revolution. This signal pulse has the shape represented in FIG. 8A, and it is largely independent of the temperature and other influences. This measuring pulse is then evaluated by means of one of the circuits according to FIG. 4 or 5, in order to obtain highly precise position signals.

Figure 9:
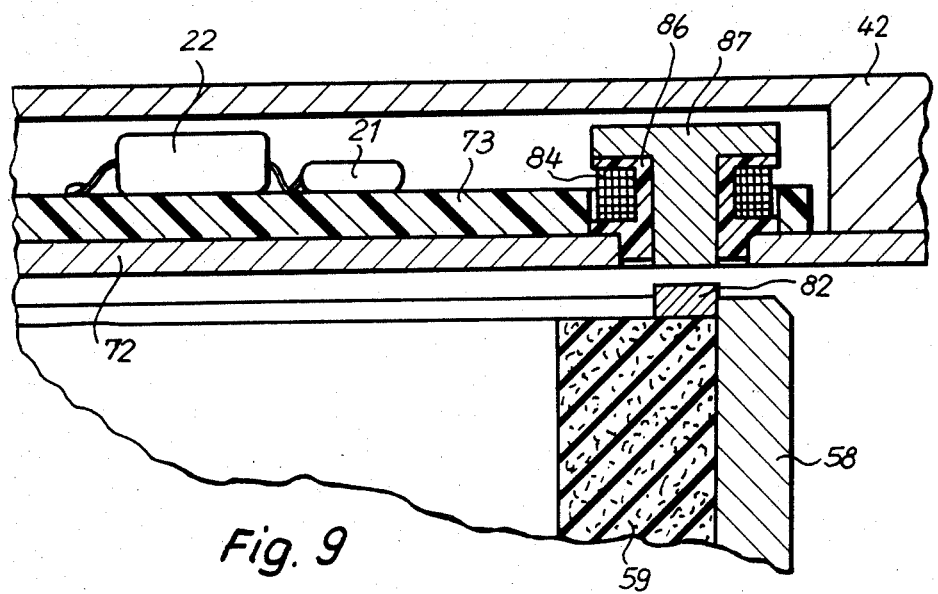
FIG. 9 shows in a larger scale a partial section through a motor similar to FIG. 6 with an alternative sensor unit.

In an alternative embodiment of FIG. 9, the PC board 73 is located on the side of the shielding plate 72 which faces away from the magnetic ring 59. On the side of the PC board 73 which faces away from the magnetic ring 59, there is indicated an integrated circuit which includes the differential amplifier 22 and the resistor 21. It is understood that the PC board 73 can carry additional circuit components, such as a rotational position sensor for the commutation. The latter can be formed by a Hall-IC, which by means of a corresponding recess of the shielding plate 72 extends downward in order to be influenced by the field of the magnetic ring 59. The sensor coil 84 is mounted on a coil body 86, which is inserted in recesses of the plates 72, 73. A coil core 87, which is T-shaped in cross section, projects through the coil body 86. Its lower end, in FIG. 9, is aligned with the orbit of the sensor magnet 82, which magnet is set on the face of the magnetic ring 59 which faces toward the shielding plate 72. In this embodiment, the sensor coil 84 has a greater axial distance from the magnetic ring 59. Also, the sensor coil 84 is to a certain extent shielded with respect to the field proceeding from the magnetic ring 59 by means of the plate 72. Thus, as a rule, the shielding ring 80 of the embodiment of FIG. 6 can be dispensed with. It is otherwise understood that the solution according to FIG. 9 operates corresponding to the functioning principle of FIG. 1.

Figure 10:
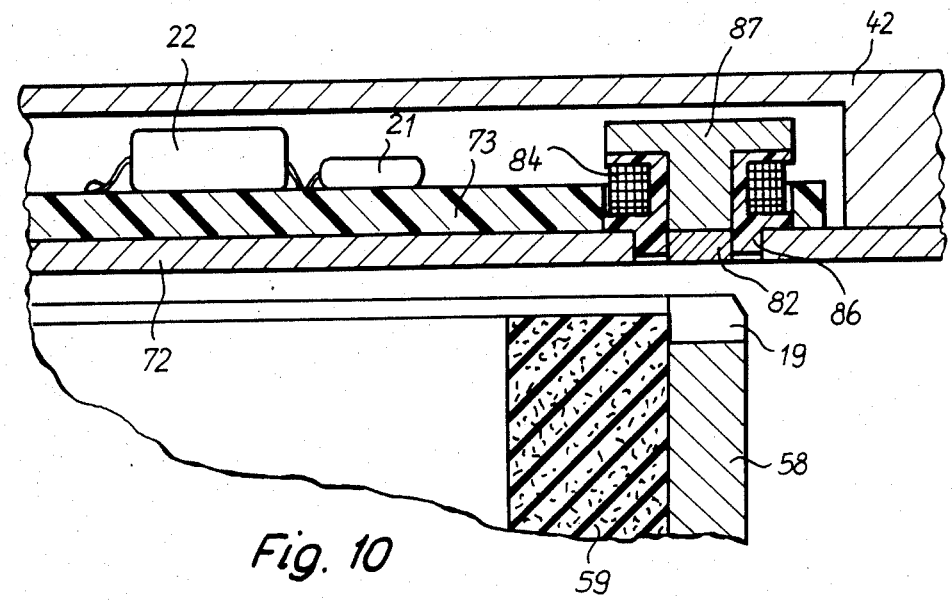
FIG. 10 shows a partial section corresponding to FIG. 9 in which is depicted a further alternative embodiment of the sensor unit.

In a further alternative embodiment according to FIG. 10, the stator construction is identical to that of FIG. 9, with the exception that the sensor magnet 82 is located at the end of the coil core 87 which faces toward the outer edge 58 of the rotor housing. The outer edge 58 in radial direction is approximately the same distance from center as the sensor magnet 82, aligning it axially with the sensor magnet, and, at one point on its circumference, it is provided with a recess 19, as is indicated in FIG. 2 with a broken line. The manner of operation of the embodiment according to FIG. 10 corresponds to that of the principle representation of FIG. 2.

Figure 11:
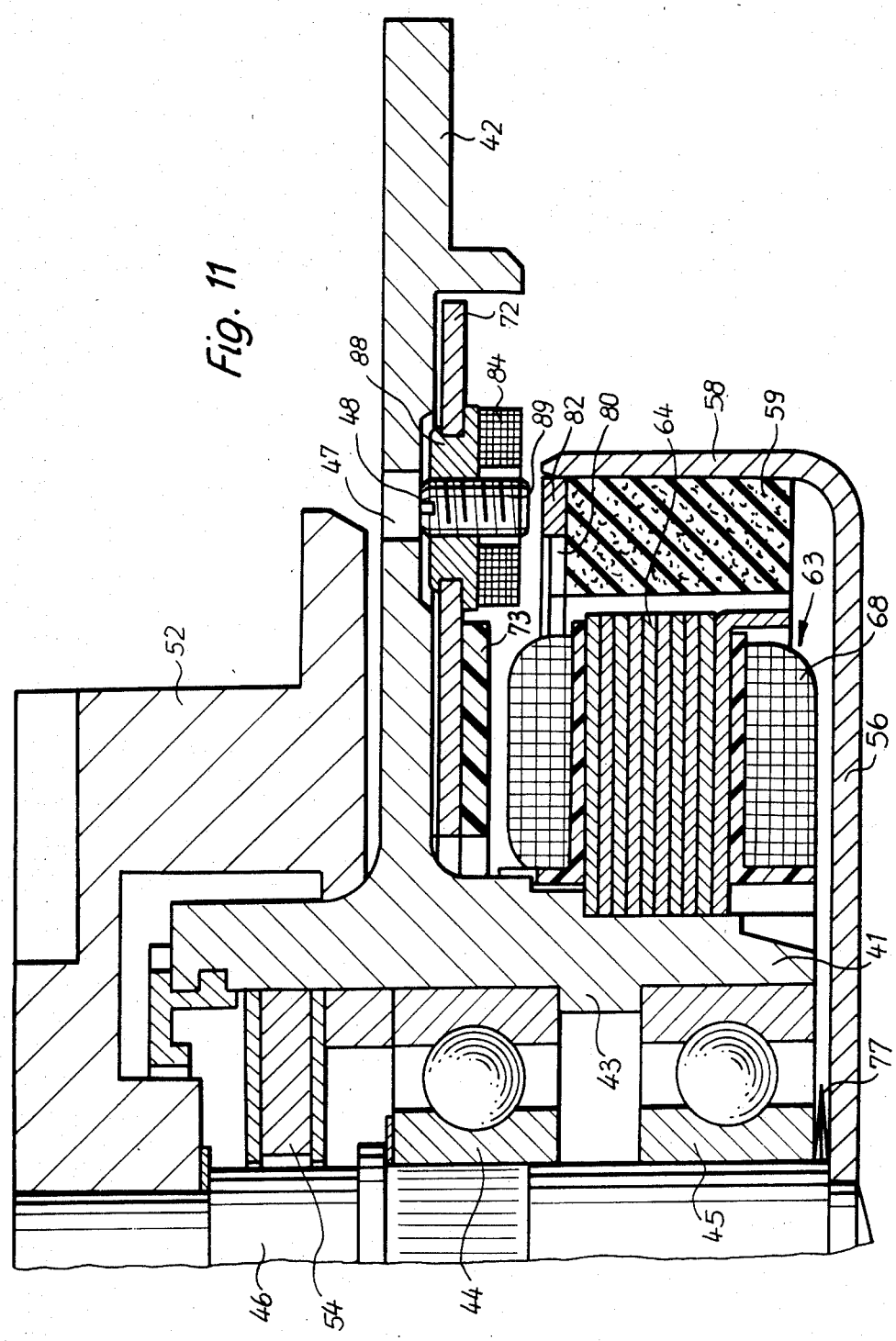
FIG. 11 shows a partial section through a disk memory drive according to a yet further alternative embodiment of the invention.

In an embodiment example according to FIG. 11, which to a great extend is similar to that of FIG. 6, a steel bush 88 is inserted into a recess of the shielding plate 72. The bush 88 includes an internal thread which works in cooperation with the external thread of an adjustable coil core 89. Aligned axially with the coil core 89, is a recess 47 of the bearing flange 42. The coil core 89, which maybe provided with a screw slot 48, is accessible through the recess 47. The coil core 89 is therefor movable in the axial direction to adjust the air gap between the sensor magnet 82 and the face of the coil core 89 turned toward it.

It is understood that the coil core 87 (FIG. 9 or 10) can be made axially adjustable in the same manner.

A magnetic disk memory drive according to FIG. 12 is mounted on a flange 90. A brushless DC motor of the external rotor type is provided, whose stack of stator plates is indicated with 91 and which carries a stator winding 92. The stator is overlapped by cup-shaped external rotor 93 of soft magnetic material. In the external rotor 93 there is provided a permanent magnet ring 94, which over the pole division is in a known manner magnetized trapezoidally or nearly trapezoidally. The external rotor 93, in a manner which is not more precisely depicted, is rototably mounted about its middle axis. On the outer side of its bottom or closed end 95, which faces away from the stator, it carries a coupling piece 96, into which a holding magnet 97 is fitted. The holding magnet 97 works together with a coupling counterpiece 98, which forms the hub for magnetic hard memory disk 99 and is made of ferromagnetic material, preferably soft iron. The memory disk 99 is provided in a plastic cassette 100. The coupling piece 96, together with the counterpiece 98, forms a coupling which permits the random exchange of the memory disk 99 including the cassette 100. Between the external rotor 93 and the memory disk 99 there is, as a result of this, no fixed angular correlation.

However, the electronics which works together with the memory disk 99 requires an index pulse corresponding to a preset angular position of the memory disk 99. A sensor device, designated as a whole with 102, serves for the generation of such an index pulse. Due to the spatial circumstances of this embodiment, the determination of the angular position is almost only possible at a flange 103 of the coupling counterpiece 98. Thereby, a sensor unit 104 of the sensor device 102 must engage in the interspace between the bottom 95 of the external rotor 93 and the flange 103. This space in axial direction has a dimension of only approximately 1 mm. In spite of this extremely cramped spatial situation, to guarantee a reliable useful signal recognition and to minimize the influence of interfering fields, the sensor unit 104 includes a thin, narrow sensor flag or sensor tip 106, which on its free end 108 carries a sensor magnet 107 in the form of a miniature permanent magnet. The sensor magnet 107, in the depicted embodiment example, is with a ceramic small magnetic plate which is, for example, 0.8 mm thick, 1 mm long and 1.5 mm wide. The sensor magnet 107, as is apparent from FIG. 13, is tapered. The direction of magnetization runs perpendicular to the longitudinal extend of the sensor tip, that is, in FIG. 12, the one pole, e.g. the north pole, lies on top and the other pole, e.g. the south pole, lies on the bottom. A sensor coil 110 is wound on the sensor tip 106 in the straight, extended region 109, which is axially adjacent the end 108. The end 108 of the sensor tip is angled off downward opposite the extended region 109 in the plane coinciding with the picture plane of FIG. 12. The size of the angled bend is dimensioned such that the middle plane 111 of the arrangement consisting of the sensor magnet 107 and the sensor tip end 108 is essentially aligned with the middle plane 112 of the part 109 of the sensor tip 106 carrying the sensor coil 110. The dimension of the sensor coil 110 in the plane of the angling off (drawing plane FIG. 12) is equal to or smaller than the sum of the dimensions of sensor magnet 107 and the end 108 in this plane. The sensor unit 104 thereby requires a minimum of installation space in the axial direction of the external rotor 93 and the coupling counterpiece 98. On the side set away from the end 108, the sensor tip 106 widens at the end of the sensor coil 110, and it thereby makes the transition into a stem 113, which is angled off at 90 degrees to make possible the mounting of the sensor tip on a non-ferromagnetic, angular carrier 114. The carrier 114 can, for example, consisting of an aluminum sheet and can be glued together with the sensor tip. It is in turn attached on the flange 90.

Provided in the flange 103 of the coupling counterpiece 98 is a groove 116, which is radially aligned with the sensor magnet 107 and which opens to the outer extent of the flange 103. This groove 116 represents a discontinuity, which, in passing the sensor tip 106, brings about a change in the magnetic field. Because of this, the induction of a voltage pulse occurs in the sensor coil 110, as is depicted schematically in FIG. 3. Interfering fields, for example, from the gap between the flange 90 and the external rotor 93, have only a minimal influence on the sensor unit 104. Contributing to this fact are the described structure of the sensor tip and the supporting of the same on the non-ferromagnetic carrier 114.

It is understood that numerous variations of the explained embodiments are possible. For example, in the arrangement according to FIGS. 12 and 13, the soft magnetic component 98, 103, instead of being equipped with the groove 116, could be provided with a bump or a radially projecting tip which is radially aligned with the sensor magnet 107. Several grooves or bumps can be distributed on the extent of the soft magnetic component 98, 103, if several pulses are required per revolution. For example, the soft magnetic component can also have external toothing, whereby a continuous sequence of pulses will be induced in the sensor coil 110.

We claim:

1. Device for a storage medium drive for the generation of one index pulse per revolution of a rotating component having a generator which, during operation, for each revolution of the rotating component generates one signal pulse that alternates once between two polarities, and having an evaluating circuit which is activated by these alternating signal pulses to generate the index pulses at its output, the evaluating circuit including a comparator having asymmetrical hysteresis with two inputs and one output, the output signal of which being functionally related to the two inputs, and the hysteresis of which is tuned to the generator output signal such that the comparator output sharply changes from a first to second potential when the amplitude of the signal pulse at a preset polarity exceeds a preset switching voltage value, and sharply changes from the second to the first potential when the signal pulse passes through its zero crossing from the preset polarity to the opposite one.

2. Device according to claim 1, wherein the generator has a permanent magnetic sensor magnet and a sensor coil which cooperates with it, the sensor magnet and the sensor coil being rotatable relative to one another with a speed corresponding to the speed of the rotating component such that they pass one another once with each revolution of the rotating component.

3. Device according to claim 1, wherein the generator has a permanent magnetic sensor magnet, a sensor coil which is non-adjustable in relation to the sensor magnet, and a soft ferromagnetic component with a discontinuity, the sensor magnet and sensor coil as a unit and the ferromagnetic component being rotatable relative to one another with a speed corresponding to the speed of the rotating component such that they pass one another once with each revolution of the rotating component.

4. Drive arrangement for storage media with a drive motor and a device for the generation of pulses with a frequency proportional to the speed of the motor, the motor having a generator which during operation generates signal pulses that alternate between two polarities and that are essentially free of direct current, an evaluating circuit which is activated by these alternating signal pulses to generate proportional speed pulses, and a comparator included in the evaluating circuit, the comparator having asymmetrical hysteresis and having two inputs and one output, the outpt signal of the generator being functionally related to the two inputs and its hysteresis being tuned to the generator output signal in such a manner that the comparator output sharply changes from a first to a second potential when the amplitude of the signal pulse with a preset polarity exceeds a preset switching voltage value, and it sharply returns from the second to the first potential when the signal pulse crosses through zero from the preset polarity to the opposite one.

5. Drive arrangement according to claim 4, wherein there is a low-pass filter preconnected to the inputs of the comparator.

6. Drive arrangement according to claim 4, wherein the comparator has a differential amplifier with an inverting input, a non-inverting input and an output, as well as a circuit connected to the differential amplifier for the forcing of the asymmetrical hysteresis.

7. Drive arrangement according to claim 6, wherein the circuit of the differential amplifier has a first resistor lying between the output and the non-inverting input of the differential amplifier, a second resistor lying between the output and a supply voltage connector and a third resistor preconnected to the non-inverting input.

8. Drive arrangement according to claim 6, wherein the inverting input of the differential amplifier is placed at zero potential.

9. Drive arrangement according to claim 4, wherein a one-shot multivibrator is connected to the output of the comparator.

10. Drive arrangement according to claim 4, wherein the drive motor is a motor of the external rotor type with a stator and a rotor magnet surrounding the stator.

11. Drive arrangement according to claim 10, wherein the generator has a permanent magnetic sensor magnet and a sensor coil which cooperates with it, the sensor magnet and the sensor coil being rotatable relative to one another with a speed corresponding to the speed of the drive motor such that they pass one another once with each revolution of the drive motor, and the sensor magnet sitting on one axial end of the rotor magnet and being connected thereto in a manner that prevents turning, the sensor coil being arranged on the stator adjacent an orbit which is travelled by the sensor magnet.

12. Drive arrangement according to claim 11, wherein placed on the one axial end of the rotor magnet arrangement is a shielding ring of soft ferromagnetic material, the shielding ring including a recess in which the sensor magnet is located.

13. Drive arrangement according to claim 11, wherein the sensor coil has a weak ferromagnetic core and the core of the coil is adjustable in a direction essentially perpendicular to the plane of the orbit of the sensor magnet.

14. Drive arrangement according to claim 11, wherein a magnetic shielding is provided between drive parts which generate magnetic fields and a space which is provided for the receiving of the magnetic storage medium and wherein the magnetic shielding has a soft magnetic shielding plate connected with the stator which lies opposite said one axial end of the rotor magnet.

15. Drive arrangement according to claim 14, wherein the sensor coil is located axially between the rotor magnet and the shielding plate.

16. Drive arrangement according to claim 15, wherein applied on said one axial end of the rotor magnet arrangement is a shielding ring of soft ferromagnetic material, the shielding ring including a recess in which the sensor magnet is located.

17. Drive arrangement according to claim 14, wherein the sensor coil has a weak ferromagnetic core and the core of the coil is adjustable in a direction essentially perpendicular to the plane of the orbit of the sensor magnet and fastened in a recess of the shielding plate is a bush provided with an internal thread, the core of the coil carrying an external thread which engages the internal thread of the bush.

18. Drive arrangement according to claim 14, wherein the shielding plate is seated axially between the sensor coil and the rotor magnet.

19. Drive arrangement according to claim 14, wherein the drive motor is a motor of the external rotor type with a stator and a rotor magnet surrounding the stator, the stator including a PC board which mounts at least the circuitry components of the comparator and the PC board being seated on the side of the shielding plate which faces toward the rotor magnet and mounting circuitry components on its side which faces toward the rotor magnet.

20. Drive arrangement according to claim 14, wherein the drive motor is a motor of the external rotor type with a stator and a rotor magnet surrounding the stator, the stator including a PC board which mounts at least the circuitry components of the comparator and the PC board being seated on the side of the shielding plate which faces away from the rotor magnet and mounting circuitry components on its side which faces away from the rotor magnet.

21. Drive arrangement according to claim 4 for a magnetic storage medium, wherein a magnetic shielding is provided between drive parts which generate magnetic fields and a space which is provided for the receiving of the magnetic storage medium.

22. Drive arrangement according to claim 4, wherein the drive motor is a motor of the external rotor type with a stator and a rotor magnet surrounding the stator, the stator including a PC board which mounts at least the circuitry components of the comparator.

23. Drive arrangement according to claim 4, wherein the generator is an inductive generator.

24. Drive arrangement according to claim 23, wherein the generator has a permanent magnetic sensor magent, a sensor coil which is non-adjustable with respect to the sensor magnet and a soft ferromagnetic component with a discontinuity, the sensor magnet and sensor coil as a unit and the ferromagnetic component being rotatable relative to one another with a speed corresponding to the speed of the drive motor such that they pass one another once with each revolution of the drive motor.

25. Drive arrangement according to claim 24, wherein the sensor coil has a soft ferromagnetic core.

26. Drive arrangement according to claim 25, wherein the sensor magnet is located on the end of the core of the coil which faces toward the soft ferromagnetic component.

27. Drive arrangement according to claim 18, wherein the drive motor is a motor of the external rotor type with a stator and a rotor magnet surrounding the stator, the rotor magnet being located in a rotor housing of soft ferromagnetic material, the rotor housing having the shape of an open bell and forming the discontinuity.

28. Drive arrangement according to claim 27, wherein the bell-shaped rotor housing has a rim which is provided with a slit which forms the discontinuity.

29. Drive arrangement according to claim 18, wherein the generator has a sensor tip of soft ferromagnetic material which near an end thereof carries the sensor magnet constructed as miniature permanent magnet and, in a region axially adjacent to it, carries the sensor coil.

30. Drive arrangement according to claim 29, wherein the end of the sensor tip which carries the sensor magnet is bent at an angle.

31. Drive arrangement according to claim 30, wherein the size of the angled bend is dimensioned such that the middle plane of the arrangement consisting of the sensor magnet and the sensor tip end which carries it is essentially aligned with the middle plane of the elongated part of the sensor tip which carries the sensor coil.

32. Drive arrangement according to claim 30, wherein in the plane in which the sensor tip is bent at an angle, the dimension of the sensor coil is equal to or smaller than the sum of the dimensions of the sensor magnet and the end of the sensor tip which carries it.

33. Drive arrangement according to claim 29, wherein the sensor magnet on the end facing away from the sensor coil is tapered in the plane which is perpendicular to the plane of the angled bend.

34. Drive arrangement according to claim 29, wherein the sensor tip is fastened to a non-ferromagnetic carrier.

35. Drive arrangement according to claim 23, wherein the generator has a permanent magnetic sensor magnet and a sensor coil which works in cooperation with it, and the sensor magnet and the sensor coil are rotatable relative to one another with a speed corresponding to the speed of the drive motor in such a manner that they pass one another once with each revolution of the drive motor.

36. Drive arrangement according to claim 35, wherein the sensor coil has a soft ferromagnetic core.

37. Drive arrangement according to claim 36, wherein the sensor coil has a weak ferromagnetic core, the sensor coil being mounted on the PC board and the shielding plate having a recess into which the core of the coil projects.

* * * * *

UNITED STATES PATENT AND TRADEMARK OFFICE
CERTIFICATE OF CORRECTION

PATENT NO. : 4,651,241

DATED : March 17, 1987

INVENTOR(S) : von der Heide et al.

It is certified that error appears in the above-identified patent and that said Letters Patent is hereby corrected as shown below:

Col. 9, Line 39, change "consisting" to --consist--.

Col. 1, Line 26, after "inside" insert --of--.
Col. 2, Line 3, after "that" insert --for example,--.
Col. 2, Line 3, delete "the case of".
Col. 2, Line 56, change "pair" to --pairs--.
Col. 3, Line 66, after "Furthermore" insert --,-- (comma).
Col. 5, Line 15, after "result" insert --,-- (comma).
Col. 5, Line 51, delete "the".
Col. 5, Line 51, delete "of" (second occurrence).
Col. 7, Line 6, delete "is" (first occurrence).
Col. 8, Line 22, change "extend" to --extent--.
Col. 9, Line 14, change "extend" to --extent--.

Signed and Sealed this

Third Day of November, 1987

Attest:

DONALD J. QUIGG

Attesting Officer

Commissioner of Patents and Trademarks